(No Model.)

F. STRUB & J. P. STOEFFLER.
Nut Lock.

No. 231,371. Patented Aug. 17, 1880.

Frank Strub and
John P. Stoeffler
INVENTORS by C. A. Snow & Co.,
ATTORNEYS

WITNESSES
Fred. G. Dieterich
W. Littell

UNITED STATES PATENT OFFICE.

FRANK STRUB AND JOHN P. STOEFFLER, OF CERES, ASSIGNORS OF ONE-THIRD OF THEIR RIGHT TO HENRY AULWES, OF GUTTENBERG, IOWA.

NUT-LOCK.

SPECIFICATION forming part of Letters Patent No. 231,371, dated August 17, 1880.

Application filed April 3, 1880. (No model.)

*To all whom it may concern:*

Be it known that we, FRANK STRUB and JOHN P. STOEFFLER, of Ceres, in the county of Clayton and State of Iowa, have invented certain new and useful Improvements in Nut-Locks; and we do hereby declare that the following is a full, clear, and exact description of the invention, which will enable others skilled in the art to which it appertains to make and use the same, reference being had to the accompanying drawings, which form a part of this specification.

Figure 1:
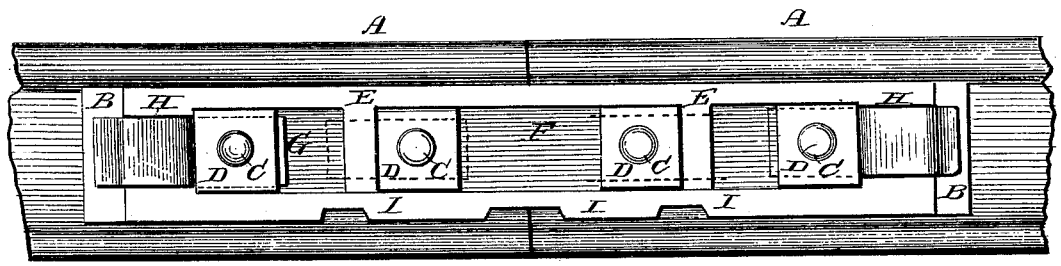
Figure 2:
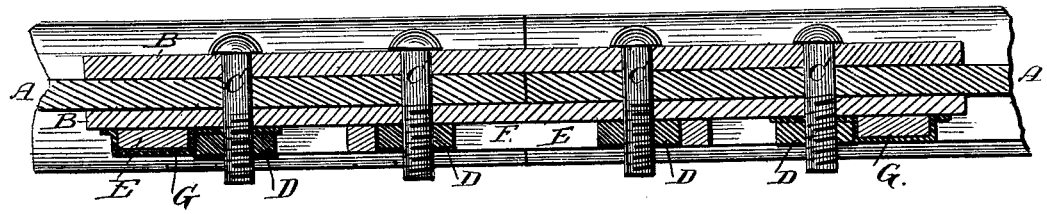
Figure 3:
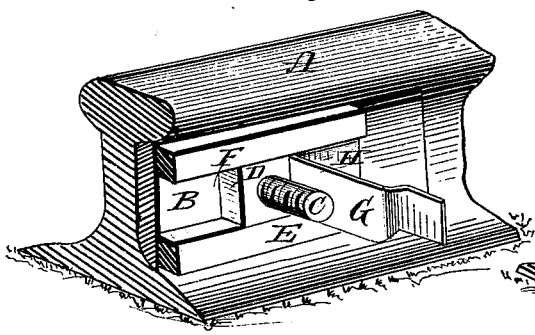
Figure 4:
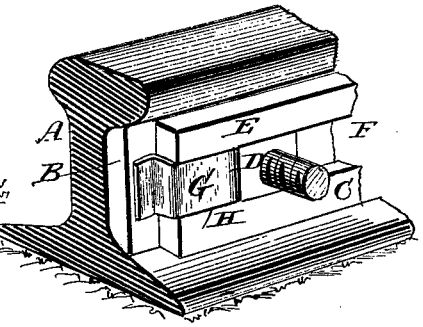

Figure 1 is a side view, Fig. 2 is a longitudinal horizontal sectional view, and Figs. 3 and 4 are detail views, in perspective, of one end of the lock-plate.

Corresponding parts in the several figures are denoted by like letters of reference.

This invention relates to that class of nut-locking devices which are especially adapted to railroad fish-joints where a row of four (and sometimes more) nuts are to be locked; and it consists in certain improvements in the construction of the same, which will be hereinafter fully described, and particularly pointed out in the claim.

In the annexed drawings, where our invention is shown applied to a rail-joint, A A represent the adjoining ends of two rails, B B the fish-plates, C C the bolts, and D D the nuts, all of which are of the usual well-known construction.

E is a plate provided with a longitudinal slot, F, in which all of the nuts which have been previously tightened may be accommodated. It will be observed that the slot F being only of the width of a single nut, or very slightly in excess thereof, it is necessary to so adjust the nuts that their upper edges shall be in one horizontal line, as shown in the drawings.

To hold the plate E securely in position, we adjust upon the bolts at the ends of the joint under the nuts narrow straps G G, of soft iron or other suitable material, which, after the plate is adjusted, are bent down over the ends thereof, which are provided with notches or recesses H H for the accommodation of said straps. In this manner the plate E is held very securely, yet in such a manner that it may be easily detached whenever it shall be necessary or desirable.

The lower edge of the lock-plate is provided with notches I, for the accommodation of the heads of the spikes by which the rails are secured.

From the foregoing description, taken in connection with the drawings hereto annexed, the operation and advantages of our invention will be readily understood. It is simple, inexpensive, durable, and may be applied or detached in a moment's time.

Having thus described our invention, we claim and desire to secure by Letters Patent of the United States—

The herein-described improved nut-locking device, consisting of the plate E, having slot F, recesses H H, and notches I I, in combination with the soft-iron straps G G, when arranged and operating substantially as and for the purpose herein shown and specified.

In testimony that we claim the foregoing as our own we have hereto affixed our signatures in presence of two witnesses.

FRANK STRUB.
JOHN PETER STOEFFLER.

Witnesses:
LOUIS BAURICK,
WILLIAM BEERMAN.